United States Patent
Neuroth et al.

(10) Patent No.: US 8,041,165 B2
(45) Date of Patent: Oct. 18, 2011

(54) SYSTEM, METHOD AND APPARATUS FOR POWER TRANSMISSION CABLE WITH OPTICAL FIBER FOR DOWNHOLE TOOL IN SUBTERRANEAN APPLICATIONS

(75) Inventors: David H. Neuroth, Claremore, OK (US); Larry V. Dalrymple, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 90 days.

(21) Appl. No.: 12/425,501

(22) Filed: Apr. 17, 2009

(65) Prior Publication Data

US 2010/0266248 A1    Oct. 21, 2010

(51) Int. Cl.
G02B 6/44    (2006.01)

(52) U.S. Cl. .......................... 385/101; 385/102

(58) Field of Classification Search .................. None
See application file for complete search history.

(56) References Cited

U.S. PATENT DOCUMENTS

| | | |
|---|---|---|
| 1,952,191 A | 3/1934 | Arutunoff |
| 4,392,714 A | 7/1983 | Brüggendieck et al. |
| 4,454,377 A | 6/1984 | Neuroth |
| 4,695,127 A | 9/1987 | Ohlhaber et al. |
| 4,709,982 A | 12/1987 | Corne et al. |
| 4,801,192 A | 1/1989 | Wehner |
| 4,856,867 A | 8/1989 | Gaylin |
| 4,881,795 A | 11/1989 | Cooper |
| 4,993,805 A | 2/1991 | Abe et al. |
| 5,015,804 A | 5/1991 | Nattel et al. |
| 5,043,037 A | 8/1991 | Buckland |
| 5,069,526 A | 12/1991 | Oestreich |
| 5,082,379 A | 1/1992 | Lindner et al. |
| 5,125,062 A | 6/1992 | Marlier et al. |
| 5,133,039 A | 7/1992 | Dixit |
| 5,181,026 A | 1/1993 | Granville |
| 5,189,718 A | 2/1993 | Barrett et al. |
| 5,189,719 A | 2/1993 | Coleman et al. |
| 5,195,158 A | 3/1993 | Bottoms, Jr. et al. |
| 5,204,926 A | 4/1993 | Bottoms, Jr. et al. |
| 5,212,750 A | 5/1993 | Wright |
| 5,222,173 A | 6/1993 | Bausch |
| 5,237,635 A | 8/1993 | Lai |
| 5,317,665 A | 5/1994 | Herrebrugh |
| 5,358,664 A | 10/1994 | Brauer |
| 5,371,825 A | 12/1994 | Traut |
| 5,380,376 A | 1/1995 | Fortin et al. |
| 5,384,430 A | 1/1995 | Anthony et al. |
| 5,408,047 A | 4/1995 | Wentzel |
| 5,491,766 A | 2/1996 | Huynh et al. |
| 5,542,020 A | 7/1996 | Horska |
| 5,555,338 A | 9/1996 | Haag et al. |

(Continued)

FOREIGN PATENT DOCUMENTS

WO    2009002448 A1    12/2008

*Primary Examiner* — Tina Wong
(74) *Attorney, Agent, or Firm* — Bracewell & Giuliani LLP

(57) ABSTRACT

A system, method and apparatus for incorporating a fiber optic cable into a power cable for an electrical submersible pump is disclosed. The fiber optic components are protected from damage during handling of the cable with pump cable components, such as lead sheaths and jacketing materials. The optical fibers are protected from damage due to corrosive oil well chemicals and gasses, as well as protected from decompression damage.

22 Claims, 3 Drawing Sheets

U.S. PATENT DOCUMENTS

| | | |
|---|---|---|
| 5,687,271 A | 11/1997 | Rabinowitz |
| 6,160,938 A | 12/2000 | Little, Jr. |
| 6,239,363 B1 | 5/2001 | Wooters |
| 6,343,172 B1 * | 1/2002 | Schiestle et al. ............... 385/101 |
| 6,400,873 B1 * | 6/2002 | Gimblet et al. ............... 385/102 |
| 6,600,108 B1 * | 7/2003 | Mydur et al. ............. 174/120 R |
| 6,859,590 B1 * | 2/2005 | Zaccone et al. ............... 385/101 |
| 6,859,592 B2 | 2/2005 | Seddon et al. |
| 7,208,855 B1 | 4/2007 | Floyd |
| 7,269,324 B2 | 9/2007 | Crownover |
| 7,397,993 B1 | 7/2008 | Nave et al. |
| 7,699,114 B2 * | 4/2010 | Ullah et al. .................... 166/385 |
| 2006/0198585 A1 | 9/2006 | Keller et al. |
| 2008/0095496 A1 | 4/2008 | Varadarajan et al. |
| 2008/0271926 A1 | 11/2008 | Coronado et al. |
| 2008/0273844 A1 | 11/2008 | Kewitsch |
| 2009/0003780 A1 | 1/2009 | Bringuier et al. |
| 2009/0067776 A1 * | 3/2009 | Ramos et al. .................... 385/12 |
| 2009/0196557 A1 * | 8/2009 | Varkey et al. ................. 385/101 |

* cited by examiner

SYSTEM, METHOD AND APPARATUS FOR POWER TRANSMISSION CABLE WITH OPTICAL FIBER FOR DOWNHOLE TOOL IN SUBTERRANEAN APPLICATIONS

BACKGROUND OF THE INVENTION

1. Technical Field

The present invention relates in general to power cables and, in particular, to an improved system, method and apparatus for an electrical power transmission cable having an optical fiber cable for an electrical submersible pump or other downhole tools in subterranean applications.

2. Description of the Related Art

Many types of electrical tools are used in subterranean applications. For example, electrical submersible pumps (ESP) are used to pump fluids from beneath the earth to the surface. Applications for ESPs and other types of downhole tools include geothermal exploration and development, carbon sequestration operations, and oil and gas wells. Such tools are typically powered by transmission cables that extend a long distance from the surface down into the subterranean borehole where the tool is located.

Power may be transmitted to an ESP by banding a specially constructed, three phase electric power cable to the production tubing. The cable is small in diameter, well protected from mechanical abuse and impervious to deterioration of its physical and electrical properties by the hot, aggressive well environments. Cables are available in a wide range of conductor sizes that permit efficient matching to motor requirements. Such cables can be manufactured in either round or flat configurations, using galvanized steel, stainless steel, or monel armor capable of withstanding the hostile environments of an oil well or water well. Solid or stranded electrical conductor construction may be used.

As described herein, the power cables contain several electrical conductors and, in some applications, also contain a smaller fiber optic cable for communications purposes. However, subterranean environments present extreme operational conditions, including certain types of highly corrosive chemicals and gasses that readily destroy the physical integrity and effectiveness of the fiber optic elements. An improved system, method and apparatus for power transmission cables having optical fiber cables for downhole tools in subterranean applications would be desirable.

SUMMARY OF THE INVENTION

Embodiments of a system, method, and apparatus for a power cable having electrical conductors for downhole tools and fiber optics for communications in subterranean applications are disclosed. In some embodiments, the invention provides means for installing fiber optic filaments in an electrical submersible pump (ESP) assembly that prevents them from being damaged during ESP cable handling and service.

In one embodiment, a buffered fiber optic filament, i.e., a fiber optic filament encased in a tube of protective material such as PEA, MEA, PEEK or FEP, is placed inside the insulation of one or more of the electrical conductors of the power cable. This design has the advantage of protecting the optical fiber and assuring that it is automatically disposed in a helical configuration when the conductor is placed in a round cable.

In another embodiment, the buffered fiber optic filament is placed beneath a lead sheath and on top of the insulation of a single insulated conductor in one or more of the electrical conductors of the power cable. In some embodiments, the buffered fiber is deployed under the lead sheath in a helix by wrapping it around the insulated conductor prior to applying the lead sheath. The buffered optical fiber also may be configured in a reversing helix, first going in one direction around the insulated conductor, and then in the opposite direction. This design insures that the buffered optical fiber is never placed in excessive tension when the conductor is bent, and facilitates applying the buffered optical fiber in a continuous manner directly behind the lead extruder during manufacturing. In yet another embodiment, the buffered optical fiber may be placed in a similar manner directly over the metal conductor and under the insulation prior to applying the insulating layer.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Referring to FIGS. 1-5, embodiments of a system, method and apparatus for a power cable having fiber optics for an electrical submersible pump (ESP) or other downhole tools in subterranean applications are disclosed. The invention comprises a power cable that is designed to operate in a pressurized subterranean environment that may contain $H_2S$, methane and/or other corrosive gasses. A buffered fiber optic filament is isolated from exposure to these gasses by placing the buffered fiber optic under a hermetically sealed lead sheath. The sheath simultaneously provides protection to the buffered fiber optic filament and the insulation surrounding the electrical conductors from exposure to the environment.

Figure 1:
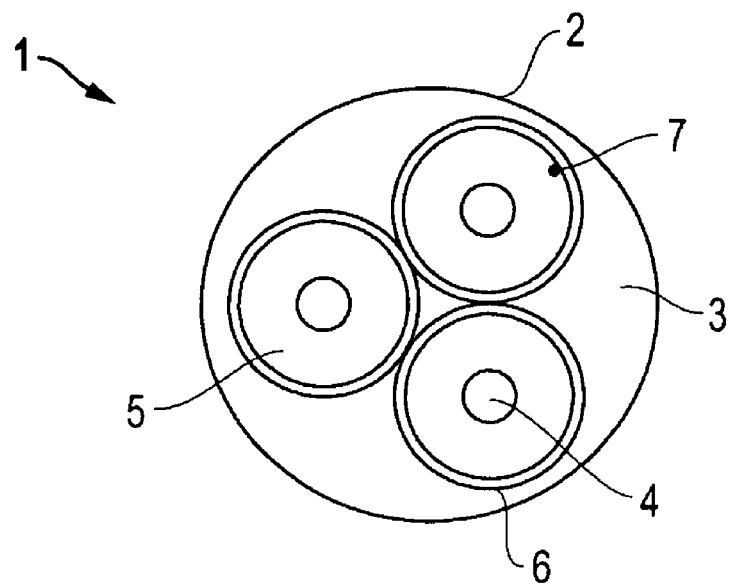
FIGS. 1-4 are sectional end views of various embodiments of cables constructed in accordance with the invention.

In the embodiment of FIG. 1, a power cable 1 comprises an outer armor layer 2 having a longitudinal axis and an axial length extending along the longitudinal axis. The armor layer 2 may comprise armor that is formed from metallic or other protective materials. A jacket filling material 3 also is located within an interior of the armor layer 2. The power cable 1 further contains a plurality of electrical conductors 4 that extend through the outer armor layer 2 along and throughout the axial length and are cabled about each other in a helical configuration. Each of the electrical conductors 4 is covered with an electrical insulation 5, such that the electrical conductors 4 are electrically insulated from each other. The conductor insulation 5 may be covered with other protective tapes and braids or extruded layers 6.

In the illustrated embodiment of FIG. 1, the power cable 1 additionally contains a buffered optical fiber 7 located inside the electrical insulation 5 of at least one of the electrical conductors 4.

Figure 2:
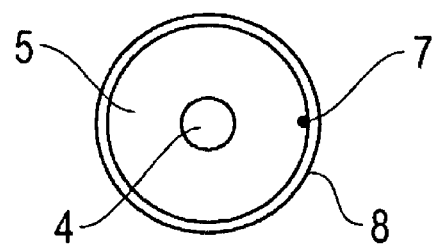
Figure 3:
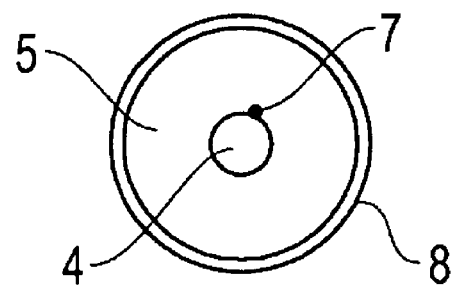
Figure 4:
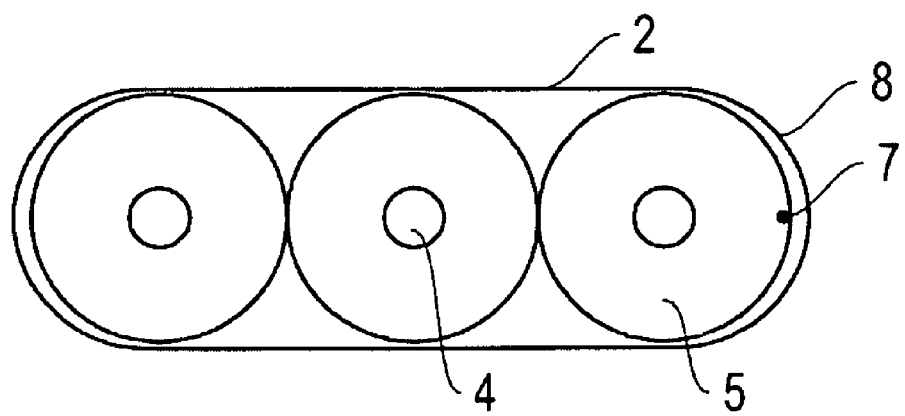

In FIG. 2, still another embodiment of the invention further comprises a lead sheath 8 that is located over the cable insulation 5 and extends throughout the lengths of the conductor 4. The buffered optical fiber 7 is located radially under the lead sheath 8. The lead sheath 8 is located around only one of the electrical conductors 4, such that the buffered optical fiber cable 7 is positioned between the lead sheath 8 and the electrical insulation 5 of one or more of the electrical conductors 4.

In additional embodiments, the optical fiber 7 may be helical in configuration and wrapped around the electrical insulation 5 of the one or more electrical conductors 4. Alternatively, the buffered optical fiber 7 may be configured in a reversing helix, first going in one direction around the electrical insulation 5, and then in the opposite direction. In still another alternate embodiment (see, e.g., FIG. 3), the buffered optical fiber cable 7 may be located directly adjacent and in contact with one or more of the electrical conductors 4, and under the electrical insulation 5 of the electrical conductors 4. Multiple ones of these single conductor assemblies can be configured as a flat cable (see, e.g., FIG. 4) or round multiconductor cable as shown in FIG. 1.

The protection provided by the invention is required for at least two reasons. First, it is known that hydrogen invades the glass used in the optical fibers, which lowers their light transmission properties and thereby degrades the fiber optic capabilities. $H_2S$ and other gasses under the high pressures and high temperatures of a subterranean environment rapidly degrade the optical fibers in this manner. By surrounding the fiber optics with an impermeable lead sheath this degrading mechanism is eliminated.

Second, the pressures in subterranean environments change rapidly and dramatically, such as when pumps are turned on, or valves are opened. These changes result in rapid reductions in pressure that are generally referred to as decompression. Gasses dissolved inside glass fibers expand during decompression causing fractures in the glass which severely degrades its properties. For example, strong fiber glass tapes are placed around power cables and located underground during operation. Upon retrieval to the surface, the glass is often completely broken in very fine pieces due to the decompression mechanism. Again, by placing the fibers under the lead sheath, this decompression damage is prevented.

Figure 5:
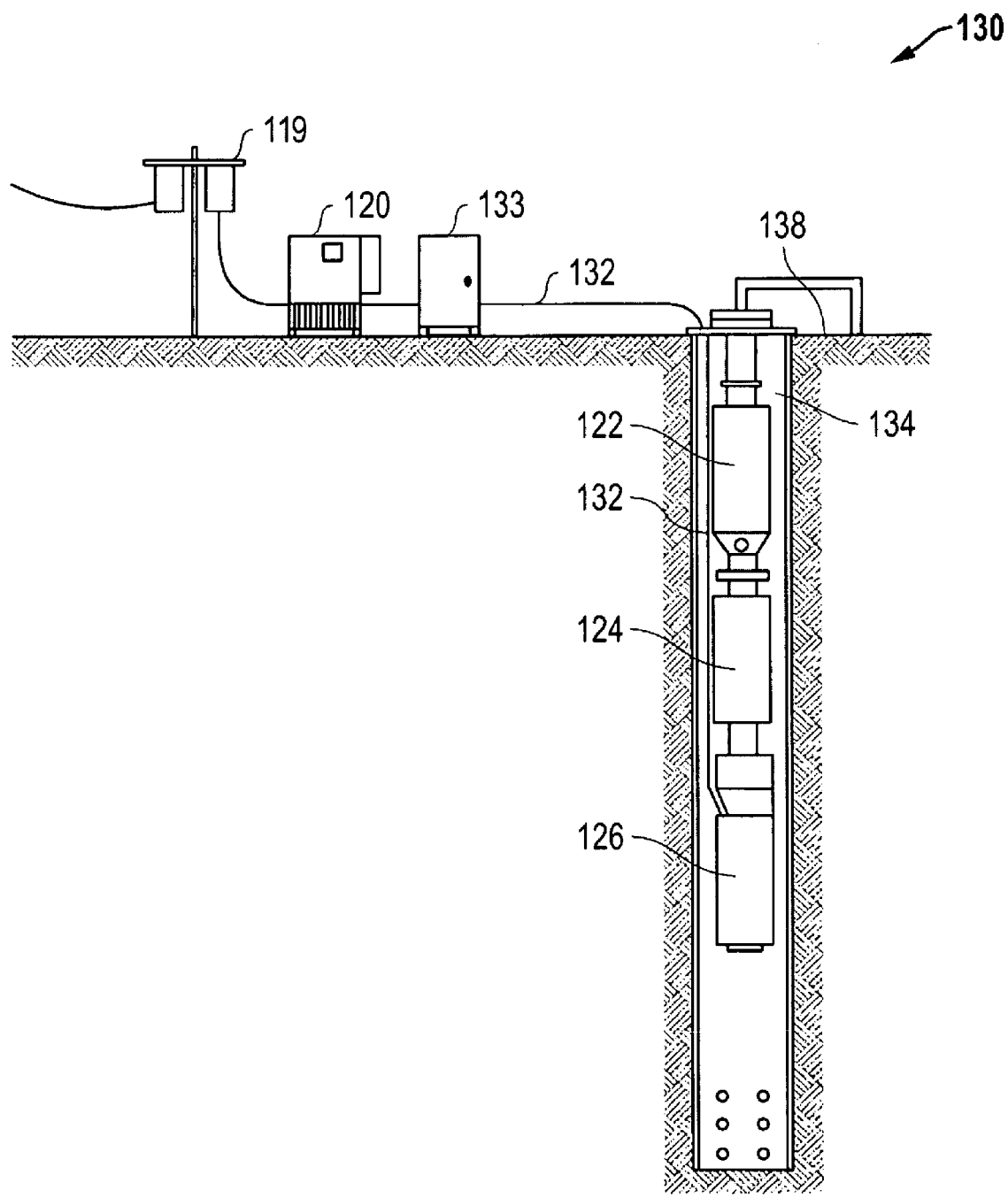
FIG. 5 is schematic diagram of one embodiment of a subterranean application for cables constructed in accordance with the invention.

FIG. 5 depicts one embodiment of a subterranean application for the invention. For example, in the illustrated embodiment, a well installation 130 has a number of components located at a surface 138 thereof. A power source 119 provides electrical power to a transformer 120 and then to a control system 133. A power cable 132, such as the numerous embodiments described herein, transmits the power downhole to a tool, such as subterranean equipment. The tool may comprise, for example, a pump 122, seal section 124 and motor 126. The pump 122 pumps fluids to other equipment at the surface 138 as is known by those of ordinary skill in the art.

While the invention has been shown or described in only some of its forms, it should be apparent to those skilled in the art that it is not so limited, but is susceptible to various changes without departing from the scope of the invention. For example, different combinations of the various elements of the embodiments described herein may be joined together to form additional alternate embodiments of the invention.

We claim:

1. A power cable, comprising:
   an outer armor layer having a longitudinal axis and an axial length extending along the longitudinal axis;
   a plurality of electrical conductors extending through the outer armor layer along the axial length, each of the electrical conductors being enclosed within a separate electrical insulation layer such that the electrical conductors are electrically insulated from each other, each electrical insulation layer having an inner diameter surface and an outer diameter surface; and
   a buffered optical fiber extending through the cable and located in contact with one of the inner and outer diameter surfaces of the insulation layer of at least one of the electrical conductors.

2. A power cable according to claim 1, wherein the outer armor layer is a wrapping formed from metallic or other protective materials, the buffered optical fiber cable is helically wrapped around said at least one of the electrical conductors, and further comprising a jacket of filling material located in an interior of the outer armor layer and surrounding the electrical conductors.

3. A power cable according to claim 1, further comprising a lead sheath located over the insulation layer of said at least one of electrical conductors, and the buffered optical fiber cable is located radially inward of the lead sheath and outward of the insulation layer of said at least one of the insulated electrical conductors.

4. A power cable according to claim 3, wherein the lead sheath is located around only one of the electrical conductors, and the buffered optical fiber is located between the lead sheath and the insulation layer of said only one of the electrical conductors.

5. A power cable according to claim 3, wherein the buffered optical fiber is configured in a reversing helix, first going in one direction concentrically around said at least one of the electrical conductors and then in the opposite direction concentrically around said at least one of the electrical conductors.

6. The power cable according to claim 1, further comprising:
   a separate protective layer concentrically surrounding the electrical insulation layer of said one of the electrical conductors; and
   wherein the buffered optical fiber is located between the protective layer and the electrical insulation layer of said one of the conductors adjacent the outer diameter surface of the electrical insulation layer of said one of the conductors.

7. The power cable according to claim 1, wherein the buffered optical fiber is located between said one of the electrical conductors and the inner diameter surface of the electrical insulation layer of said one of the electrical conductors.

8. A power cable, comprising:
   an outer armor layer having a longitudinal axis and an axial length extending along the longitudinal axis;
   a plurality of electrical conductors extending through the outer armor layer along the axial length, each of the electrical conductors being insulated with insulation such that the electrical conductors are electrically insulated from each other;
   an optical fiber cable extending along the axial length of at least one of the insulated electrical conductors and located radially exterior to the insulation; and
   a lead sheath covering said at least one of the insulated electrical conductors such that the optical fiber cable is located radially inward of the lead sheath.

9. A power cable according to claim 8, wherein the outer armor layer is a wrapping formed from metallic or other protective materials, and further comprising jacket filling material located in an interior of the outer armor layer.

10. A power cable according to claim 8, wherein the power cable is a flat cable.

11. A power cable according to claim 8 wherein the power cable is round and the electrical conductors are formed in a helix during assembly to make the power cable more flexible.

12. A power cable according to claim 8, wherein the lead sheath is located around only one of the electrical conductors, and the optical fiber cable is located between the lead sheath and the electrical insulation of at least one of the electrical conductors.

13. A power cable according to claim 8, wherein the optical fiber cable is helical in configuration and wrapped around the electrical insulation of only one of the electrical conductors.

14. A power cable according to claim 8, wherein the optical fiber cable is configured in a reversing helix, first going in one direction and then in the opposite direction.

15. A power cable according to claim 8, wherein the optical fiber cable is located directly adjacent one of the electrical conductors and under the insulation of said one of the electrical conductors.

16. A system for a subterranean operation, comprising:
   an electrical submersible pump for installation within a well;
   a power cable for transmitting electrical power from a power source downhole to the electrical submersible pump; the power cable comprising:
   an outer armor layer having a longitudinal axis and an axial length extending along the longitudinal axis;
   a plurality of electrical conductors extending through the outer armor layer along the axial length, each of the electrical conductors being concentrically enclosed within a separate electrical insulation layer such that the electrical conductors are electrically insulated from each other each of the electrical insulation layers having an inner diameter surface and an outer diameter surface; and
   an optical fiber cable extending through the outer armor layer in contact with one of the inner and outer diameter surfaces and wrapped helically around and concentric with one of the electrical conductors.

17. A system according to claim 16, wherein the outer armor layer is a wrapping formed from metallic or other protective materials, and further comprising jacket of filling material located in an interior of the outer armor layer and enclosing the electrical conductors.

18. A system according to claim 16, further comprising:
   a separate protective layer concentrically surrounding the insulation layer of said one of the electrical conductors; and
   wherein the optical fiber cable is positioned between the insulation layer of said one of the electrical conductors and the protective layer.

19. A system according to claim 16, wherein the optical fiber cable is configured in a reversing helix, first going in one direction around said one of the electrical conductors, and then in the opposite direction around said one of the electrical conductors.

20. A system according to claim 16, wherein the optical fiber cable is wrapped helically around the electrical insulation layer of said one of the electrical conductors.

21. The power cable according to claim 16, further comprising:
   a separate protective layer concentrically surrounding the electrical insulation layer of said one of the electrical conductors; and
   wherein the optical fiber cable is located between the protective layer and the electrical insulation layer of said one of the conductors.

22. The power cable according to claim 16, wherein the optical fiber cable is located between said one of the electrical conductors and the electrical insulation layer of said one of the electrical conductors.

* * * * *